United States Patent [19]

Paske, Jr. et al.

[11] Patent Number: 4,707,297

[45] Date of Patent: Nov. 17, 1987

[54] REMOVABLE GUIDEPATH FOR AUTOMATED GUIDANCE VEHICLES

[75] Inventors: Richard Paske, Jr.; Michael Pallmer; William L. King, Jr., all of Holland, Mich.

[73] Assignee: Bell & Howell Company, Chicago, Ill.

[21] Appl. No.: 857,729

[22] Filed: Apr. 29, 1986

[51] Int. Cl.$^4$ .............................................. C09K 11/06
[52] U.S. Cl. ................................. 252/301.16; 106/8; 180/168; 252/301.33; 252/301.34; 252/301.35; 252/301.36; 525/378; 526/923; 528/277
[58] Field of Search ............... 252/301.16, 301.33, 252/301.34, 301.35, 301.36; 525/378; 526/923; 106/8; 528/277; 180/98

[56] References Cited

U.S. PATENT DOCUMENTS

| | | | |
|---|---|---|---|
| 2,074,251 | 3/1937 | Braun | 180/79.1 |
| 2,331,144 | 10/1943 | Sitter | 180/168 |
| 2,904,700 | 9/1959 | Rockey | 250/225 |
| 2,996,621 | 8/1961 | Barrett | 250/202 |
| 3,030,870 | 4/1962 | Gill | 252/301.34 |
| 3,105,954 | 10/1963 | Gill | 252/301.36 |
| 3,235,024 | 2/1966 | Barrett | 180/79.1 |
| 3,364,356 | 1/1968 | Jones | 250/203 |
| 3,482,644 | 12/1969 | Krieger et al. | 180/98 |
| 3,493,920 | 2/1970 | MacMunn | 340/1 |
| 3,498,403 | 3/1970 | Kohls | 180/98 |
| 3,628,624 | 12/1971 | Wesener | 180/98 |
| 3,642,087 | 2/1972 | Sampey | 180/98 |
| 3,644,739 | 2/1972 | Wilkinson et al. | 250/209 |
| 3,666,500 | 5/1972 | Lange et al. | 106/8 |
| 3,708,668 | 1/1973 | Tilley | 250/202 |
| 3,739,177 | 6/1973 | Ko | 250/206 |
| 3,744,586 | 7/1973 | Leinauer | 180/79.1 |
| 3,800,902 | 4/1974 | Keller | 180/79.1 |
| 3,859,517 | 1/1975 | Okuma | 250/202 |
| 3,935,922 | 2/1976 | Cooper et al. | 180/168 |
| 4,003,445 | 1/1977 | DeBruine | 180/98 |
| 4,020,918 | 5/1977 | Houskamp et al. | 180/79.1 |
| 4,070,510 | 1/1978 | Kahn | 106/8 |
| 4,071,645 | 1/1978 | Kahn | 106/8 |
| 4,157,477 | 6/1979 | Kall et al. | 250/548 |
| 4,172,063 | 10/1979 | O'Brill | 260/296 |
| 4,307,791 | 12/1981 | DeBruine | 180/168 |

OTHER PUBLICATIONS

De Ment, Fluorochemistry; Chemical Publishing Co., Brooklyn, N.Y., 1945, pp. 1,144,145,195.
Kirk-Othmer Encyclopedia of Polymer Science and Technology, vol. 7, 1967, Interscience N.Y., N.Y.

*Primary Examiner*—Arthur P. Demers
*Attorney, Agent, or Firm*—Mason, Kolehmainen, Rathburn & Wyss

[57] ABSTRACT

An aqueous guidepath coating composition includes a fluorescent dye, and an acrylic ionomer, and is particularly useful in positional control of and positional detection by stimulated emission-guided Automated Guidance Vehicles (AGV). This coating, used to mark the actual position of the guidance track to be followed by the AGV, affords unexpected improvements over previous guidepath compositions in removal and reapplication characteristics, in post-application durability and in substrate aesthetics.

29 Claims, No Drawings

REMOVABLE GUIDEPATH FOR AUTOMATED GUIDANCE VEHICLES

FIELD OF THE INVENTION

The present invention relates to an improved aqueous coating composition, including a fluorescent or phosphorescent compound applied in a predetermined guidepath for directing a stimulated-emission controlled Automated Guidance Vehicle (AGV). More particularly, the guidepath coating composition of the present invention comprises a fluorescent dye carried by an alkali-soluble carrier composition formed from an acrylic ionomer emulsion to bind the fluorescent or phosphorescent dye component to resilient, hard or fibrous substrates in the predetermined guidepath. After application of the coating composition onto an AGV-traversable substrate to form a guidepath and drying of the coating composition, the coating is stimulated by an ultraviolet light source from an AGV and emits visible through near infrared radiation detected by photocell sensors on the AGV to guide the AGV along the predetermined guidepath.

BACKGROUND OF THE INVENTION AND PRIOR ART

A variety of automated guidance vehicles (AGV) have been developed, with a principal use of performing delivery or work functions in an office or industrial facility. The basic types of guidance systems used on these unmanned industrial vehicles have been permanent tracks, buried wire, reflected light, and radio controlled.

Track-guided vehicles ride along a fixed rail or a track and are guided by the contour of the track. This technique is often unacceptable, especially in office situations, since the presence of a fixed or permanent track on many floor surfaces is aesthetically, as well as physically, undesirable. The installation of such a permanent track is expensive; and it is diffcult and expensive to change the location of the track, thereby greatly reducing the flexibility of the system.

Buried wire guidance systems have been applied successfully to various material handling systems, including hospital food tray delivering vehicles and office mail carts. In this system, a wire is buried in the floor along the track the vehicle is to follow and both ends of the wire are terminated at an excitation source. This technique has serious limitations, including the impracticality of installing a buried wire system in an existing structure and the system's lack of flexibility.

In reflected light sensing systems, a brightly visible line, contrasting markedly with the surface of the floor, is laid along the path to be followed by the AGV. In this type of guidance system, there is no variation in the frequency of the incident and reflected light. The vehicle includes a visible light source that illuminates the floor and photocell sensors that detect the level of light reflected from the floor. Both the background and guideline illumination are detected to determine guideline position, but problems have been encountered with such reflected light sensing systems since spurious illumination from the floor has impaired the ability of the system to detect the difference between the guideline and the background illumination. Therefore, accurate tracking with a light sensing system may be unreliable, leading the AGV to follow a false, non-existant guide path.

A positive attribute of a reflected light system is that an existing line can be removed and a new guidepath applied. However, the impermanence and visibility of a guidepath can also be a drawback, since visible, removable guidepaths invite vandalism and are aesthetically unappealing. This aesthetic unacceptability often precludes the use of a visible light-reflected system in many applications. Another disadvantage of reflected visible light-tracking systems is they are effectively limited to use on flat hard- or resilient-type surfaces, such as concrete or tile. Problems with obtaining the necessary reflectance levels, and with the aesthetic undesirability of a solid, bright line on a carpet, prevents the application of such a guidepath on fibrous surfaces.

To overcome some of the above-mentioned disadvantages, automated guidance vehicles were developed that followed invisible fluorescent guidepaths. The guidance system of these AGVs works on the principle of applying a fluorescent dye-containing guidepath. As the AGV traverses the guidepath, a source of ultraviolet light on the AGV illuminates the guidepath causing the fluorescent dye to emit visible radiation, which is detected by photocell sensors on the AGV, and, through the correct circuitry, the AGV is steered along the guidepath. Generally, the photocell sensors sense the emitted visible radiation and produce an error output signal proportional to the variation of the vehicle's position from a predetermined lateral position with respect to the guideline. A steering mechanism then reacts in response to the error signal so as to correct the vehicle's position and to keep it on the guideline.

Although fluorescent guidepaths have been used to guide AGVs for mail delivery or material handling purposes, there are still several disadvantages. For use in mail delivery, these guidepaths are restricted in performance by the aesthetics of the office environment. In general, a guidepath must be virtually invisible when viewed under ambient office conditions, should adhere to a variety of substrates, must withstand normal traffic and maintenance, and should be easily deactivated to allow modification of the mail delivery route in case of office modification. An exception to these restrictions occurs in some offices, where a visible guidepath is desired to keep carts and boxes off of the guidepath.

In addition, the guidepath is necessarily designed to be detected by the AGV in a reliable fashion with a minimum of interference by other floor surface factors. For use with the present stimulated emission AGVs on the market, the guidepath must fluoresce in the visible range when stimulated by ultraviolet radiation. The guidepath must overcome potential interferences with changes in surface color due to bold patterns or transitions from one surface or surface area to another.

Numerous compositions have been used to apply a fluorescent guidepath. These compositions fall into two broad categories, solvent-borne solutions and water-borne emulsions.

The solvent-borne guidepath compositions previously developed suffer from a number of disadvantages. These formulations generally contain flammable solvents, requiring precautions to be taken during production, storage, shipping, and application. The solvent vapors liberated during application to a floor have an objectionable odor, requiring work to be performed after normal working hours. In addition, the solvents are toxic by inhalation, requiring full building ventilation and respirators to protect the workers during application.

The solvent solution formulations provide good visual aesthetics, acceptable traffic and maintenance resistance, and easy deactivation when applied to hard or resilient surfaces, such as composition tiles, marble, concrete, and ceramic tile. In addition, certain solvent formulations can be successfully used on most carpeted surfaces. Major performance failures of these systems include soiling of the guidepath after extended periods if proper floor cleaning is not maintained and a compromise in visual aesthetics, in many cases, after deactivation. In addition, the products used for deactivation of these guidepaths are flammable materials which liberate solvents during application.

The water-borne emulsion guidepath compositions previously used contained polymers which cure at room temperature upon mixing with a cross-linking agent. Mixing must occur immediately prior to application. The amount of cross-linking agent is critical to the performance of these coatings, requiring an involved packaging procedure. In addition, mixing reduces the useful life of the product from up to 12 months to only 24 hours, resulting in wasted product during field application.

The water-borne emulsion compositions provide acceptable visual aesthetics, outstanding traffic and maintenance resistance on hard or resilient surfaces, such as composition tiles, concrete, marble, and ceramic tile and can be removed with some difficulty using suitable solvents. On most carpeted surfaces, however, they produce visible guidepaths which cannot be removed. Thus, their practical utility is limited to hard or resilient surface guidepaths.

The present invention provides water-borne guidepath compositions capable of being applied to a variety of substrates without the need for engineering controls on respirable air. The composition includes an ionically cross-linked ionomer, eliminating the need for separate packaging of a cross-linking agent and mixing on-site. In addition, these ionically cross-linked binder compositions give good visual aesthetics, good traffic and maintenance resistance, and outstanding deactivation when applied to hard or resilient floors and to most carpeted surfaces. The compounds and compositions used for deactivating these guidepaths are non-flammable, do not release harmful solvents, and do not result in a compromise in visual aesthetics after deactivation.

In accordance with the present invention, a single-package guidepath composition, providing new and unexpected characteristics of guidepath durability, reliability and deactivation is achieved, which heretofore has been unknown in the art. More specifically, the coating composition of the present invention can be easily applied to several types of substrates, including hard, resilient and fibrous substrates, and after drying, provide an invisible coating suitable for guiding stimulated-emission controlled AGVs. The described composition produces a very durable coating that maintains the integrity of the guidepaths for long periods, yet the coating also possesses the novel characteristic of easy removal, thus allowing ease of variation of the guidepath.

SUMMARY OF THE INVENTION

In brief, it has been found that a mixture of a fluorescent or phosphorescent compound or compounds in an acrylic ionomer emulsion carrier provides a novel composition that, when applied in a specified manner, achieves a fluorescent or phosphorescent coating providing new and unexpected results as a guidepath for automated guidance vehicles (AGV).

The guidepath composition of the present invention includes an aqueous emulsion polymer binder phase and a fluorescent or phosphorescent pigment dispersion phase, providing a composition that can be applied to and removed from a variety of AGV-traversable surfaces. This composition possesses the new and unexpected characteristics of ease and safety of application to a variety of substrates, providing a uniform coating that has excellent durability and that can be easily deactivated where variance in the guidepath is desired.

Therefore, it is an object of the present invention to provide an aqueous, liquid fluorescent or phosphorescent dye-containing coating composition.

It is also an object of the present invention to provide a coating composition that cures, without cross-linking agents, to a durable, hard coating, for use as a guidepath for stimulated-emission guided AGVs.

Another object of the present invention is to provide a coating composition that cures to an invisible coating, if desired, so as not to disturb the aesthetics of the coated surface.

Another object of the present invention is to provide a coating composition capable of being easily deactivated and removed, after application and curing, to facilitate changing or eliminating the AGV guidepath.

Another object of the present invention is to provide a coating composition including both a binder phase, comprising an acrylic ionomer emulsion; and a fluorescent or phosphorescent dye phase.

Another object of the present invention is to provide a coating composition including both a binder phase, comprising an alkali-soluble acrylic polymer emulsion and an acrylic ionomer emulsion; and a fluorescent or phosphorescent dye phase.

Another object of the present invention is to provide a coating composition including both a binder phase, comprising a wax emulsion, such as polyethylene wax, and an acrylic ionomer emulsion; and a fluorescent or phosphorescent dye phase.

Another object of the present invention is to provide a coating composition including both a binder phase, comprising a wax emulsion, such as polyethylene wax, an alkali-soluble acrylic polymer emulsion, and an acrylic ionomer emulsion; and a fluorescent or phosphorescent dye phase.

Another object of the present invention is to provide a coating composition including a fluorescent or phosphorescent dye phase, wherein the dye phase is capable of stimulation by ultraviolet light, generally radiation having a wavelength less than 400 nm, and emission of visible through near infrared radiation, at wavelengths greater than about 400 nm to about 2500 nm, for detection by the AGV guidance system.

Still another object of the present invention is to provide a fluorescent or phosphorescent dye-containing coating composition that will produce a desired AGV guidepath showing unexpected ease of application and deactivation, durability and AGV detection, while maintaining the overall aesthetics of the environment.

The above and other objects and advantages of the present invention will become apparent from the following detailed description of the preferred embodiments.

DETAILED DESCRIPTION OF THE PREFERRED EMBODIMENTS

In accordance with an important feature of the present invention, the coating compositions of the present invention comprise an aqueous emulsion polymer binder phase and a fluorescent or phosphorescent pigment or dye dispersion phase. These phases are combined to produce a homogeneous, single-package composition, with coatings resulting from this composition showing unexpected utility as guidepaths for stimulated-emission guided Automated Guidance Vehicles (AGVs). Stimulated-emission guided AGVs are well-known and currently in use, however the present composition offers a definite advancement in the art relating to guidepaths for stimulated-emission guided AGVs. The aqueous emulsion polymer binder phase and fluorescent or phosphorescent dye dispersion phase of the present invention are formulated, and combined to yield coating compositions of good stability, and to provide invisible, durable and easily deactivated guidepaths for guidance of AGVs.

To achieve the full advantage of the present invention, the fluorescent or phosphorescent pigment dispersion phase is an aqueous dispersion including one or more fluorescent and/or phosphorescent dyes or pigments; one or more wetting agents; and one or more stabilizers. In accordance with an important feature of the present invention, the fluorescent or phosphorescent dye dispersion phase of the composition includes a fluorescent or phosphorescent pigment capable of absorbing radiation of one frequency and responding by emitting radiation of another frequency. The fluorescent or phosphorescent component can be any having an emission energy different from its excitation energy.

Presently available stimulated-emission AGVs are equipped with an ultraviolet radiation source and detectors capable of following a guidepath having any emissive pigment that emits radiation at wavelengths greater than 400 nm. Wavelengths above 400 nm to about 2500 nm correspond to emission radiation in the visible through the near infrared range. Present day AGVs are equipped with ultraviolet light excitation sources and visible through near infrared light detection sensors as the basis of their guidance systems. This eliminates some AGV guidance problems relating to spurious background emissions and false guidepaths.

Many fluorescent and phosphorescent compounds can be used successfully in the guidepath coating compositions of the present invention. The fluorescent or phosphorescent pigment component of the pigment dispersion phase of the composition of the present invention includes one or more removable fluorescent or phosphorescent pigments, either organic or inorganic in structure.

Some suitable classes of fluorescent compounds useful alone or in admixture in the guidepath compositions of the present invention include the quinazolones, the oxazoles, the benzimidazoles, or the hydrazines; or classes of compounds represented by such compounds as the 1,8-dihydroxyanthraquinones, 4,5-diphenylimidazolones, p-methoxyphenylhydrazones, 6-hydroxynicotinic acids, salicylaldehyde semi-carbazones, 2-aminobiphenyls, 2-phenylbenzoxazoles, the class of bis (8-hydroxyquinolino)ZnII compounds, N,N"-bis-(salicylideneamino)oxamidenes, or the 1-cyanoformimidic acids. The following specific examples of fluorescent and phosphorescent compounds is indicative of the dyes and pigments which are expected to function suitably when used in the guidepath compositions of the present invention, and it is given by way of illustration and not by way of limitation.

2-(2-(napthylenesulfonylamino)phenyl)-4H-3,1-benzoxazin-4-one;
2-(1-(napthylenesulfonylamino)phenyl)-4H-3,1-benzoxazin-4-one;
2-(2-(p-toluenesulfonylamino)phenyl)-4H-3,1-benzoxazin-4-one;
2-(2-(o-toluenesulfonylamino)phenyl)-4H-3,1-benzoxazin-4-one;
2-(2-(2,4,6-trimethylbenzenesulfonylamino)phenyl)-4H-3,1-benzoxazin-4-one;
2-(2-(4-isopropylbenzenesulfonylamino)phenyl)-4H-3,1-benzoxazin-4-one;
2-(2-aminophenyl)-4H-3,1-benzoxazin-4-one;
2-(2-methylaminophenyl)-4H-3,1-benzoxazin-4-one;
2-(2-tosylaminophenyl)-4H-3,1-benzoxazin-4-one;
2-(2-(N-methyl-N-tosylamino)phenyl)-4H-3,1-benzoxazin-4-one;
2-(2-acetaminophenyl)-4H-3,1-benzoxazin-4-one;
2-(2-benzoylaminophenyl)-4H-3,1-benzoxazin-4-one;
2-(2-benzenesulfonylaminophenyl)-4H-3,1-benzoxazin-4-one;
2-(2-(p-nitrobenzoylaminophenyl)-4H-3,1-benzoxazin-4-one;
2-(2-(p-nitrobenzenesulfonylaminophenyl)-4H-3,1-benzoxazin-4-one;
2-(2'-hydroxyphenyl)-benzimidazole;
2-(2'-hydroxyphenyl)-benzoxazole;
2-(2'-hydroxyphenyl)-benzothiazole;
2-(2'-hydroxy-5'-aminophenyl)-benzothiazole;
2-(2'-hydroxy-3'-bromophenyl)-benzothiazole;
2-(2'-hydroxy-4'-bromophenyl)-benzothiazole;
2-(2'-hydroxy-5'-bromophenyl)-benzothiazole;
2-(2'-hydroxy-3',5'-dibromophenyl)-benzothiazole;
2-(2'-hydroxy-3'-chlorophenyl)-benzothiazole;
2-(2'-hydroxy-4'-chlorophenyl)-benzothiazole;
2-(2'-hydroxy-5'-chlorophenyl)-benzothiazole;
2-(2'-hydroxy-3',5'-dichlorophenyl)-benzothiazole;
2-(2',3'-dihydroxyphenyl)-benzothiazole;
2-(2',4'-dihydroxyphenyl)-benzothiazole;
2-(2',5'-dihydroxyphenyl)-benzothiazole;
2-(2',6'-dihydroxyphenyl)-benzothiazole;
2-(2'-hydroxy-3',5'-diiodophenyl)-benzothiazole;
2-(2'-hydroxy-3'-methoxyphenyl)-benzothiazole;
2-(2'-hydroxy-4'-methoxyphenyl)-benzothiazole;
2-(2'-hydroxy-5'-methoxyphenyl)-benzothiazole;
2-(2'-hydroxy-3'-methylphenyl)-benzothiazole;
2-(2'-hydroxy-4'-methylphenyl)-benzothiazole;
2-(2'-hydroxy-5'-methylphenyl)-benzothiazole;
2-(2'-hydroxy-3',5'-dimethylphenyl)-benzothiazole;
2-(2'-hydroxy-3'-nitrophenyl)-benzothiazole;
2-(2'-hydroxy-5'-nitrophenyl)-benzothiazole;
2-(2'-hydroxy-3',5'-dinitrophenyl)-benzothiazole;
2-(2'-hydroxy-5'-fluorophenyl)-benzothiazole;
2-(2'-hydroxy-4'-(dimethylamino)phenyl)-benzothiazole;
2-(2'-hydroxy-4'-(diethylamino)phenyl)-benzothiazole;
2-(2'-hydroxy-5'-acetamidophenyl)-benzothiazole;
2-(2'-hydroxy-5'-benzamidophenyl)-benzothiazole;
2-(2'-hydroxy-5'-benzylideneaminophenyl)-benzothiazole;
2-(2'-hydroxy-3',5'-bisphthalamidomethylphenyl)-benzothiazole;

2-(2'-hydroxyphenyl-3',5'-bisphthalimidomethyl) benzothiazole;

2-(2'-hydroxyphenyl-3'-phthalimidomethyl) benzothiazole;

2-(2'-hydroxyphenyl-5'-phthalimidomethyl) benzothiazole;

4-(4'-dimethylaminobenzylidene)-2-phenyloxazolin-5-one;

2-anilide-2',5'-dichlorobenzoylamino-1,9-anthapyrimidone;

bis-2,5-(benzoxazoyl)hydroquinone;

bis-2,5-(benzimidazoyl)hydroquinone;

bis-2,5-(benzothiazoyl)hydroquinone;

5-(4-(dimethylamino)benzylidene)barbituric acid;

Sodium 3-(2-benzothiazolyl)-4-hydroxybenzene-sulfonate;

Zinc sulfide doped with copper;

Zinc sulfide doped with manganese;

Zinc sulfide and cadmium sulfide doped with copper;

Zinc sulfide and cadmium sulfide doped with silver;

Sodium heteropolytungstate polyhydrate doped with europium;

Zinc sulfide doped with calcium, cadmium, magnesium, molybdenum, and silicon;

Cadmium sulfide doped with aluminum, calcium, magnesium, silicon, and zinc;

Zinc selenide doped with aluminum, cadmium, and silicon;

Cadmium selenide doped with aluminum, magnesium, silicon, and zinc;

Calcium sulfide and strontium sulfide doped with heavy metals; and mixtures thereof.

These fluorescent and phosphorescent compounds can be applied to a variety of fibrous, hard and resilient substrates, and can be easily removed. It is unexpected to find inorganic pigments included in the above list, since inorganics are usually weak line emitters, however the listed compounds do emit enough energy to excite the AGV detector.

The fluorescent or phosphorescent pigment dispersion phase is included in the guidepath composition of the present invention in an amount of 0.1 to 20 percent by weight of the coating composition (wet basis). To achieve the full advantage of the present invention, the fluorescent or phosphorescent dispersion phase includes a blend of one or more fluorescent or phosphorescent pigments, at least one emulsifying agent capable of effectively dispersing the fluorescent or phosphorescent pigment in the aqueous phase of the dispersion, a thickening agent for aiding in the long term suspension of the pigment(s), such as gums, clays or emulsion resins, and sufficient water (e.g., 25% to 80% by weight) to provide a dispersion having a fluorescent or phosphorescent pigment content of 5 to 75% by weight of the wet dispersion. In the dry coating composition the fluorescent or phosphorescent compound comprises about 0.5% to about 25% based on the weight of solids in the guidepath as dryed and cured. The particular emulsifying agent and thickening agent, e.g., emulsion resin, can vary depending upon the fluorescent pigment utilized, however, examples of the emulsifying agent include glycols, polyols, or nonionic surfactants and examples of emulsion resins include polyacrylates, polyacrylic acids or polyacrylamides. The fluorescent or phosphorescent pigment dispersion phase also may include other optional components, including, but not limited to, defoamers, sequestering agents, preservatives and the like. The fluorescent pigment dispersion phase is made independent of, and then combined with the polymer binder phase to produce the fluorescent guidepath coating compositions of the present invention.

In accordance with an important feature of the present invention, the polymer binder phase of the guidepath composition of the present invention includes an ionomer emulsion having a reversible cross-link comprising a divalent metal-ammonium complex. The ionomer emulsions are, for example, metal-complexed acrylics; metal-complexed polyurethanes or metal-complexed waxes, such as polyolylene waxes that impart the new, unexpected and dramatic ease of deactivation to the guidepath of the present invention. These acrylic ionomers are reversibly crosslinked through a metal-ammonium complex containing a divalent metal ion, usually zinc or zirconium. The crosslinking reaction occurs between two carboxyl groups on the polymer and the metal-ammonium complex to form a "bridge" between the carboxyl groups. The crosslinking reactions are important to improving adhesion and hardness of the coating and take place between two different polymer molecules. It is important to note that the polymers used have multiple carboxyl groups, providing the capacity to form a complex, interweaved, three-dimensional matrix after crosslinking is completed.

The reaction mechanism is diagrammed below:

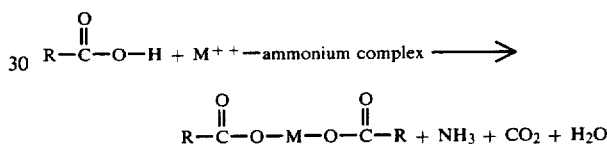

where R denotes a polymer chain such as acrylic, polyethylene wax, and/or a polyurethane, and M denotes a metal ion, such as Zn (zinc) or Zr (zirconium).

During the cure phase, ammonia ($NH_3$) and carbon dioxide ($CO_2$) are released, forcing the reaction to proceed in the direction of crosslinking. This results in an insoluble, hardened polymer. The reaction is reversed to remove the guidepath coating composition by contacting the coating composition with an aqueous solution containing soluble carbonate ($CO_3^{-2}$) and ammonium ($NH_4^+$) ions. This results in soluble, uncrosslinked polymer which can be removed easily. Also, the ionomer emulsion, when combined with a wax, e g., polyethylene wax, and an alkali-soluble resin, unexpectedly retains the critical guidepath qualities of durability, detergent resistance, invisibility, slip resistance, and powdering resistance. Suitable acrylic ionomer emulsions, containing the polymer pre-reacted with the metal-ammonium complex and ready for immediate use, are exemplified by the following tradename products.

RHOPLEX B-505;
RHOPLEX B-832;
RHOPLEX B-924;
RHOPLEX B-1162;
RHOPLEX B-1339;
RHOPLEX B-1604;
NEOCRYL SR-203;
NEOCRYL SR-270;
NEOCRYL SR-276; and
NEOCRYL CL-300.

Alternatively, it is possible to add a metal-ammonium complex to a polymer to produce a metal-crosslinked polymer emulsion. As described in the Examples, this procedure requires preparing a metal-ammonium complex, or purchasing a metal-ammonium complex, then adding the polymer to yield a metal-crosslinked polymer emulsion. Commercially available metal-ammonium complexes may be exemplified by the following tradenames products:
BACOTE 20;
ZINC TETRAMMONIUM CARBONATE;
CHEMCOR ZAC; and
AZC.

Commercially available polymers requiring the addition of metal-ammonium complexes may be exemplified by the following tradename products made by B.F Goodrich:
CARBOSET XL-11;
CARBOSET XL-19;
CARBOSET XL-22;
CARBOSET XL-27;
CARBOSET XL-30;
CARBOSET XL-33;
CARBOSET XL-37;
CARBOEST 514H;
CARBOSET 514A;
CARBOSET 515;
CARBOSET 525;
CARBOSET 526;
CARBOSET 531;
CARBOSET 533H; and
EMULSION XL-20
polyethylene wax from Chemical Corporation of America.

In accordance with an important feature of the present invention, the guidepath coating composition of the present invention includes the ionomer emulsion in an amount of about 2% to about 90% based on the total weight of the combined wet guidepath composition. When dryed and cured, the acrylic ionomer comprises about 40% to about 99% by weight of the dryed guidepath composition. To achieve the full advantage of the present invention, the guidepath composition includes the ionomer emulsion in an amount of 5% to 50% by weight of the combined (total) wet guidepath composition and about 60% to 95% by weight on the dry basis, to provide a guidepath coating having new and unexpected guidepath qualities heretofore unknown to the art. The selection of an acrylic ionomer, and its percentage in the composition, directly influences the ultimate qualities of the guidepath, especially its hardness, detergent resistance, durability, invisibility and removability.

In accordance with one important embodiment of the present invention, the polymer binder phase of the guidepath composition of the present invention includes one or more alkali-removable polymers having the properties of guidepath hardness and durability during use, while allowing the guidepath to be deactivated by dissolution during guidepath modification. To achieve the full advantage of this embodiment of the present invention, the polymer binder phase of the guidepath compositions of the present invention includes an appropriate mixture of emulsion polymer(s), leveling aid(s), coalescing agent(s) and stabilizer(s).

Alkali-removable polymers can be included in the polymer binder phase as an emulsion, and are readily available as aqueous emulsions of alkali-soluble acrylic, acrylate or acrylamide polymers. To achieve the full advantage of the present invention, the polymer binder phase of the composition of the present invention includes 1 to 10 parts of an alkali-soluble acrylic emulsion, 2 to 20 parts of a wax emulsion, such as a polyethylene wax emulsion, and 30 to 75 parts of an ionomer emulsion in 100 total parts of polymer binder phase. Combination of the pigment dispersion phase and the polymer binder phase compositions to achieve the guidepath composition of the present invention results in a coating composition including the resin binder phase, the fluorescent or phosphorescent dye dispersion phase, and any necessary and desired formulation aids that do not materially alter the basic function of the coating composition.

The final composition in wet form generation is as follows:
0.1 to 20.0% flourescent or phosphorescent dye; usually 0.5 to 5%;
0 to 5% level agent; usually 0-4%;
0 to 10% neutralizing agent; usually 0-5%;
0 to 10% coalescing agent; usually 0-4%;
0 to 15% alkali-soluble polymer; usually 0-4 %;
2 to 90% acrylic ionomer emulsion; usually 0.5-40%;
0 to 10% wax; usually 0-4%; and
balance water.

After drying, the guidepath compositon generally comprises:
0.5-25% flourescent or phosphorescent dye;
0-5% leveling agent;
0-10% neutralizing agent;
0-10% coalescing agent;
0-10% alkali-soluble polymer;
40-99% ionomer; and
0-10% wax.

The aqueous polymer emulsions have been found to give a coating composition that provides all of the desirable properties required for an invisible fluorescent AGV guidepath that can be applied to a variety of substrates. Among the many benefits and advancements over the prior art derived from the disclosed aqueous polymer binder phase is ease of formulation, storage stability, ease of application, capacity to be dryed to an invisible film, excellent adherence to a variety of hard, resilient and fibrous substrates, excellent durability under use on a variety of hard, resilient and fibrous substrates, absence of yellowing after application, reliability of AGV guidepath, ease of maintaining the guidepath substrate without destruction of the guidepath, ability to add visible pigments should a visible guidepath be desired, maintenance of aesthetics, and ease of deactivation and removal to allow variance of the guidepath route.

In accordance with another important feature, the guidepath compositions are modified easily to design a variety of fluorescent or phosphorescent dye-containing guidepaths having varying properties ranging from very hard and durable, with increased difficulty of removal, for areas of high and heavy traffic or for areas where the guidepath is not expected to be varied, to softer and less durable, with increased ease of removal, for areas of low traffic or for areas where the guidepath may be frequently changed. It is a further benefit that all intermediate degrees of hardness and durability can be achieved by selecting the proper type and percentage of polymer emulsion combination.

To achieve the full advantage of the alkali-soluble polymer binder containing embodiment of the present invention, the alkali-soluble polymer binder comprises an alkali-soluble acrylic polymer aqueous emulsion additionally functioning as a leveling aid to assist in the formation of a uniform, durable, invisible coating. The use of an all-acrylic leveling aid in compositions of the present invention produces an improved guidepath compared to compositions utilizing leveling aids of a different chemical structure. Other available leveling aids, such as rosin-based alkali soluble resins, contain chemical linkages that gradually oxidize, eventually leading to discoloration of the guidepath. The guidepath therefore slowly loses its invisibility, and can be seen as a visible strip along floor, which seriously detracts from the aesthetics of the environment. The alkali-soluble acrylic polymer emulsions are exemplified by such tradename products as ACRYSOL 644, NEOCRYL BT-5, NEOCRYL BT-7, NEOCRYL BT-8, NEOCRYL BT-24, NEOCRYL BT-125, or NEOCRYL BT-520; however any alkali-soluble acrylic resin, is useful in accordance with this embodiment of the present invention. The acrylic resin is included in the polymer binder phase composition in an amount of about 0% to 15% of the guidepath polymer binder phase composition (wet basis).

To achieve the full advantage of the present invention, the polymer binder phase compositions of the present invention include a wax emulsion, such as a polyethylene wax emulsion or other durability aid capable of forming a transparent film when cured. The wax emulsion is included in the compositions to impart guidepath durability under use on all substrates as well as slip resistance and black-heel mark resistance on hard and resilient substrates. These attributes contribute to the useful life and aesthetic qualities of the guidepath. Suitable polyethylene wax emulsions are exemplified by such tradenames as
POLY-EM 20;
POLY-EM 40;
POLY EMULSION 392 N35;
POLY EMULSION 325 N35;
POLY EMULSION 316 N30;
POLY EMULSION 330 N35;
POLY EMULSION 392 A25;
POLY EMULSION 293 LE30;
POLY EMULSION 121 N30;
CHEMCOR EMULSION 2-67A;
POLY EMULSION 286;
POLY EMULSION 540 N30;
POLY EMULSION 540 N40;
POLY EMULSION 540 A25;
POLY EMULSION 629 A30;
POLY EMULSION 629 N40;
POLY EMULSION 10N30;
POLY EMULSION 656 A25;
POLY EMULSION 371 N30;
POLY EMULSION 43 N40;
MICHEM EMULSION 39235-N;
MICHEM EMULSION 52030;
MICHEM EMULSION 68725;
MICHEM EMULSION 66630;
MICHEM EMULSION 65625;
MICHEM EMULSION 80325;
MICHEM EMULSION 46025;
MICHEM EMULSION 02125;
MICHEM EMULSION 02925;
MICHEM EMULSION 88725;
MICHEM EMULSION 82225;
MICHEM EMULSION 39225-A;
MICHEM EMULSION 66930;
MICHEM EMULSION 39625;
MICHEM EMULSION 79030;
MICHEM EMULSION 18325;
MICHEM EMULSION 79130;
MICHEM EMULSION 63825; and
ZINPOL 14.

However, other wax emulsions, can be used in the present invention. The above-listed emulsions are nonoxidized anionic or nonionic polyethylene wax emulsions that form a clear film when cured at room temperature.

In accordance with an important feature of the present invention it has been found that although polyethylene waxes per se are not inherently alkali-strippable, when the polyethylene wax is comingled with a metal-crosslinked ionomer in accordance with the principles of the present invention, removal from hard, resilient and fibrous substrates is facilitated to produce easily deactivated guidepaths. Similarly, the waxes are easily removable when combined with both the metal-crosslinked ionomer and an alkali-soluble resin in accordance with the present invention.

The coating composition of the present invention may also include an amount of a neutralizing agent effective for rendering the composition neutral. The neutralizing agent is ordinarily a strong base such as those selected from the group consisting of triethanolamine, ammonium hydroxide, sodium hydroxide, potassium hydroxide, and other strong bases. Ordinarily, the neutralizing agent is included in the guidepath composition in an amount of 0 to 7 parts by weight per 100 parts of dry guidepath composition.

Of course, those skilled in the art will appreciate that additional components can be included in the compositions of the present invention such as biocides, chelating agents, stabilizers, surfactants, solvents, defoamers, coalescing agents, and plasticizers. For example, KATHON CG brand of biocide can be included to preserve the composition during shipping by counteracting bacterial growth. Also, plasticizing agents can be included to provide appropriate coating formations on certain surfaces. Anti-foaming agents can be added to control foam formation during production and application. Stabilizers are commonly used to improve the freeze/thaw behavior of these types of coatings.

As a further benefit, the guidepath resulting from this composition is detergent resistant to most carpet cleaners and carpet cleaning methods, and all sodium lauryl sulfate-type based dry-foam carpet cleaners. The coating is also abrasion resistant and anti-soiling.

In order that those skilled in the art may best practice the teachings of the present invention, the following examples are given by way of illustration and not by way of limitation.

EXAMPLE 1

A typical metal-ammonium complex solution is prepared by dissolving 7.2 parts zinc oxide (ZnO) and 12.7 parts ammonium carbonate (($NH_4$)$_2CO_3$) in 71.4 parts distilled water. Then 8.7 parts concentrated aqueous ammonia (28% $NH_4OH$) is slowly added with stirring until clear, to produce a zinc-ammonium complex. (A similar process is used to give the zirconium-ammonium complex.) The metal-ammonium complex is then added to 100 parts of polymer solids in an amount up to 5 parts of metal ion to produce a metal-crosslinked polymer emulsion.

EXAMPLE 2

A fluorescent dispersion is prepared by charging 1.7 g tetrasodium ethylenediaminetetraacetate, 200 grams Carboset 514H (40% active acrylic resin emulsion), 50.2 grams ethylene glycol, 5.0 grams ammonium hydroxide, 0.32 grams Foamaster VF non-silicone defoamer, 119.9 grams 2-(2-(naphthylsulfonylamino)phenyl)-4H-3,1-benzoxazin-4-one, and 623 grams distilled water into a ball mill..The order of addition is not important. This charge is milled for approximately six hours.

Separately, a polymer binder emulsion is prepared by charging 855 grams distilled water, 32.1 grams Acrysol 644 (42% active emulsion), 13.5 grams Fluorad FC-120 ammonium perfluoroalkyl sulfonates (25% active), 0.38 grams SWS-211 silicone emulsion defoamer (10% active), 90 grams ethylene glycol, 2.25 grams KATHON CG 4-chloro-2-methyl-4-isothiazolin-3one, 975 grams Rhoplex B-1604 (38% active ionomer emulsion), and 169 grams Poly EM-40 (40% active polyetheylene wax emulsion) to a one liter flask equipped with a stirrer. The order of addition is not important. This charge is stirred for one hour.

A guidepath composition is prepared by charging 3200 grams distilled water, 80 grams of the fluorescent dispersion, and 720 grams of the polymer binder emulsion to a one liter flask. The order of addition is not important. This charge is stirred for one hours.

EXAMPLE 3

A fluorescent dispersion is prepared in accordance with the procedure in Example 2.

A polymer binder emulsion is prepared by charging 1000 grams of distilled water and 3000 grams of Rhoplex B-1604 (38% active ionomer emulsion) to a one liter flask equipped with a stirrer. The order of addition is not important. The charge is stirred for one hour.

The guidepath composition is prepared by charging 1293 grams of distilled water, 40 grams of fluorescent dispersion, and 2667 grams of polymer binder emulsion of Example 2 to a one liter flask. The order of addition is not important. This charge is stirred for one hour.

EXAMPLE 4

The guidepath compositions were subjected to a study of aesthetics, resistance to traffic and maintenance, and ease of deactivation.

A variety of carpets with different fiber types and colors were collected. To each of the carpets, the guidepath formulation was applied in a manner to give a well-defined guidepath line. After overnight drying, the resulting guidepaths were evaluated for visual aesthetics under fluorescent lighting. In addition, the guidepaths were tested for their ability to guide an AGV.

A portion of each guidepath on each carpet was placed in a hallway for a 3 month period of time to evaluate the effect of traffic. The guidepaths were evaluated weekly during this time period for visual aesthetics and ability to guide an AGV.

A portion of each guidepath on each carpet was tested for deactivation using a proprietary deactivation formula. The resulting carpet surface was evaluated after drying for visual aesthetics and inability to guide an AGV.

Results of these tests showed that guidepaths applied using the formulations in Examples 2 and 3 were capable of effectively guiding an AGV. The guidepath applied with the formulation in Example 2 showed good visual aesthetics, good resistance to traffic and maintenance, and excellent deactivation on most carpets tested. The guidepath applied with the formulation in Example 3 showed fair visual aesthetics, good resistance to traffic and maintenance, and excellent deactivation on most carpets tested.

It should be understood that the present disclosure has been made only by way of preferred embodiment and that numerous changes in details of construction, combination and arrangement of parts may be resorted to without departing from the spirit and scope of the invention as hereinunder claimed.

What is claimed and desired to be secured by Letters Patent of the United States is:

1. A guidepath composition for detection of emitted radiation by automated guidance vehicles comprising an aqueous dispersion of a sensor-detectable amount of a fluorescent or phosphorescent compound and an effective amount of 5% or less by weight of the aqueous dispersion of a binder including a reversibly crosslinked ionomer.

2. The composition of claim 1 wherein the fluorescent or phosphorescent compound comprises a compound capable of absorbing radiation in a first frequency range and emitting radiation in a second frequency range.

3. The composition of claim 2 wherein the fluorescent or phosphorescent compound comprises a compound capable of absorbing radiation in a frequency range of about 200 to about 400 nm and emitting radiation in a frequency range of about 400 to about 2500 nm.

4. The composition of claim 3 wherein the fluorescent or phosphorescent compound comprises a compound capable of emitting radiation in a frequency range of about 400 to about 800 nm.

5. The composition of claim 4 wherein the fluorescent or phosphorescent compound comprises a compound capable of emitting radiation in a frequency range of about 500 to about 600 nm.

6. The composition of claim 5 wherein the fluorescent dye is selected from the group consisting of 2-(2-(naphthylenesulfonylamino)phenyl)-4H-3,1-benzoxazin-4-one;
2-(1-(napthylenesulfonylamino)phenyl)-4H-3,1-benzoxazin-4-one;
2-(2-(p-toluenesulfonylamino)phenyl)-4H-3,1-benzoxazin-4-one;
2-(2-(o-toluenesulfonylamino)phenyl)-4H-3,1-benzoxazin-4-one;
2-(2-(2,4,6-trimethylbenzenesulfonylamino)phenyl)-H-3,1-benzoxazin-4-one;
2-(2-(4-isopropylbenzenesulfonylamino)phenyl)-H-3,1-benzoxazin-4-one; 2-(2-aminophenyl)-4H-3,1-benzoxazin-4-one; 2-(2-methylaminophenyl)-4H-3,1-benzoxazin-4-one;
2-(2-tosylaminophenyl)-4H-3,1-benzoxazin-4-one;
2-(2-(N-methyl-N-tosylamino)phenyl)-4H-3,1-benzoxazin-4-one;
2-(2-acetaminophenyl)-4H-3,1-benzoxazin-4-one;
2-(2-benzoylaminophenyl)-4H-3,1-benzoxazin-4-one;
2-(2-benzenesulfonylaminophenyl)-4H-3,1-benzoxazin-4-one;
2-(2-(p-nitrobenzoylaminophenyl)-4H-3,1-benzoxazin-4-one;
2-(2-(p-nitrobenzenesulfonylaminophenyl)-4H-3,1-benzoxazin-4-one;
2-(2'-hydroxyphenyl)-benzimidazole;
2-(2'-hydroxyphenyl)-benzoxazole;
2-(2'-hydroxyphenyl)-benzothiazole;
2-(2'-hydroxy-5'-aminophenyl)-benzothiazole;
2-(2'-hydroxy-3'-bromophenyl)-benzothiazole;
2-(2'-hydroxy-4'-bromophenyl)-benzothiazole;
2-(2'-hydroxy-5'-bromophenyl)-benzothiazole;
2-(2'-hydroxy-3',5'-dibromophenyl)-benzothiazole;
2-(2'-hydroxy-3'-chlorophenyl)-benzothiazole;

2-(2'-hydroxy-4'-chlorophenyl)-benzothiazole;
2-(2'-hydroxy-5'-chlorophenyl)-benzothiazole;
2-(2'-hydroxy-3',5'-dichlorophenyl)-benzothiazole;
2-(2',3'-dihydroxyphenyl)-benzothiazole;
2-(2',4'-dihydroxyphenyl)-benzothiazole;
2-(2',5'-dihydroxyphenyl)-benzothiazole;
2-(2',6'-dihydroxyphenyl)-benzothiazole;
2-(2'-hydroxy-3',5'-diiodophenyl)-benzothiazole;
2-(2'-hydroxy-3'-methoxyphenyl)-benzothiazole;
2-(2,-hydroxy-4'-methoxyphenyl)-benzothiazole;
2-(2'-hydroxy-5'-methoxyphenyl)-benzothiazole;
2-(2'-hydroxy-3'-methylphenyl)-benzothiazole;
2-(2'-hydroxy-4'-methylphenyl)-benzothiazole;
2-(2'-hydroxy-5'-methylphenyl)-benzothiazole;
2-(2'-hydroxy-3',5'-dimethylphenyl)-benzothiazole;
2-(2'-hydroxy-3'-nitrophenyl)-benzothiazole;
2-(2'-hydroxy-5'-nitrophenyl)-benzothiazole;
2-(2'-hydroxy-3',5'-dinitrophenyl)-benzothiazole;
2-(2'-hydroxy-5'-fluorophenyl)-benzothiazole;
2-(2'-hydroxy-4'-(dimethylamino)phenyl)-benzothiazole;
2-(2'-hydroxy-4'-(diethylamino)phenyl)-benzothiazole;
2-(2'-hydroxy-5'-acetamidophenyl)-benzothiazole;
2-(2'-hydroxy-5'-benzamidophenyl)-benzothiazole;
2-(2'-hydroxy-5'-benzylideneaminophenyl)-benzothiazole;
2-(2'-hydroxy-3',5'-bisphthalamidomethylphenyl)-benzothiazole;
2-(2'-hydroxyphenyl-3',5'-bisphthalimido methyl)-benzothiazole;
2-(2'-hydroxyphenyl-3'-phthalimidomethyl) benzothiazole;
2-(2'-hydroxyphenyl-5'-phthalimidomethyl) benzothiazole;
4-(4'-dimethylaminobenzylidene)-2-phenyloxazolin-5-one;
2-anilide-2',5'-dichlorobenzoylamino-1,9-anthapyrimidone
bis-2,5-(benzoxazoyl)hydroquinone;
bis-2,5-(benzimidazoyl)hydroquinone;
bis-2,5-(benzothiazoyl)hydroquinone;
5-(4-(dimethylamino)benzylidene)barbituric acid;
Sodium 3-(2-benzothiazolyl)-4-hydroxybenzenesulfonate;
Zinc sulfide doped with copper;
Zinc sulfide doped with manganese;
Zinc sulfide and cadmium sulfide doped with copper;
Zinc sulfide and cadmium sulfide doped with silver;
Sodium heteropolytungstate polyhydrate doped with europium;
Zinc sulfide doped with calcium, cadmium, magnesium, molybdenum, and silicon;
Cadmium sulfide doped with aluminum, calcium, magnesium, silicon, and zinc;
Zinc selenide doped with aluminum, cadmium, and silicon;
Cadmium selenide doped with aluminum, magnesium, silicon, and zinc;
Calcium sulfide and strontium sulfide doped with heavy metals; and
mixtures thereof.

7. The composition of claim 6, wherein the fluorescent or phosphorescent compound dye is 2-(2-(naphthylsulfonylamino)phenyl)-4H-3,1-benzoxazin-4-one, 2-(3',5'-bisphthalimidomethyl-2'-hydroxyphenyl)benzothiazole 2-(3'-phthalimidomethyl-2'-hydroxyphenyl)-benzothiazole, 2-(5'-phthalimidomethyl-2'-hydroxyphenyl)benzothiazole, or mixtures thereof.

8. The composition of claim 1 wherein the fluorescent or phosphorescent compound is present in an amount of 0.0005% to 20% by weight of the dry composition.

9. The composition of claim 8 wherein the fluorescent or phosphorescent compound is present in an amount of 0.01% to 5% by weight of the composition.

10. The composition of claim 1 further including an alkali-soluble acrylic polymer in an amount of 0.10% to 1.5% by weight of the composition.

11. The composition of claim 1 wherein the wax comprises polyethylene wax in an amount of 0% to 10% by weight of the composition.

12. The composition of claim 11 wherein the wax comprises polyethylene wax in an amount of 1% to 2% by weight of the composition.

13. The composition of claim 1 wherein the reversibly crosslinked ionomer is a metal-crosslinked acrylic, polyurethane or polyethylene wax polymer.

14. The composition of claim 13 wherein the metal-crosslinker is zinc or zirconium.

15. The composition of claim 1 wherein the reversibly crosslinked ionomer is a cross-linked acrylic polymer.

16. The composition of claim 15 wherein the reversibly crosslinked ionomer is a zinc crosslinked acrylic polymer.

17. An aqueous guidepath composition for detection of emitted light by automated guidance vehicles comprising an aqueous emulsion of a sensor-detectable amount of a fluorescent or phosphorescent compound and an effective amount of 5% or less by weight of the aqueous emulsion of a reversibly crosslinked ionomer.

18. The composition of claim 17 wherein the fluorescent or phosphorescent compound comprises a compound capable of absorbing radiation in a first frequency range and emitting radiation in a second frequency range.

19. The composition of claim 18 wherein the fluorescent or phosphorescent compound comprises a compound capable of absorbing radiation in a frequency range of about 200 to about 400 nm and emitting radiation in a frequency range of about 400 to about 2500 nm.

20. The composition of claim 19 wherein the fluorescent or phosphorescent compound comprises a compound capable of emitting radiation in a frequency range of about 400 to about 800 nm.

21. The composition of claim 20 wherein the fluorescent or phosphorescent compound comprises a compound capable of emitting radiation in a frequency range of about 500 to about 600 nm.

22. The composition of claim 19, wherein the fluorescent or phosphorescent compound dye is 2-(2-(naphthylsulfonylamino)phenyl)-4H- 3,1-benzoxazin-4-one, 2-(3',5'-bisphthalimidomethyl-2'-hydroxyphenyl)benzothiazole 2(3'-phthalimidomethyl;-2'-hydroxyphenyl)-benzothiazole, 2-(5'-phthalimidomethyl-2'-hydroxyphenyl)benzothiazole, or mixtures thereof.

23. The composition of claim 17 wherein the fluorescent or phosphorescent compound is present in an amount of 0.0005% to 20% by weight of the composition.

24. The composition of claim 17 wherein the reversibly crosslinked ionomer is a metal-crosslinked acrylic, polyurethane or polyethylene wax polymer.

25. The composition of claim 17 wherein the metal-crosslinker is zinc or zirconium.

26. The composition of claim 17 wherein the reversibly crosslinked ionomer is a cross-linked acrylic polymer.

27. The composition of claim 17 wherein the fluorescent or phosphorescent compound is present in an amount of 0.0005% to 20% by weight of the dry composition.

28. The composition of claim 24 wherein the metal-crosslinker is zine or zirconium.

29. The composition of claim 1 wherein the ionomer is a zinc cross-linked acrylic polymer.

* * * * *

UNITED STATES PATENT AND TRADEMARK OFFICE
CERTIFICATE OF CORRECTION

PATENT NO. : 4,707,297
DATED : November 17, 1987
INVENTOR(S) : Richard Paske, Jr. et al It is certified that error appears in the above-identified patent and that said Letters Patent is hereby corrected as shown below:

Col. 14, line 44, before "H" (at start of line), insert --4--;
line 45, before "H" (at end of line), insert --4--;
line 46, change the multiple space to a single space;
line 47, change the multiple space to a single space;
Col. 15, lines 31, 33, 35, 44 and 68, change multiple space to a single space;
Col. 16, line 1, multiple space should be a single space;
lines 55 and 57, change multiple space to a single space;
line 57, after "2" and before "(3'" insert a hyphen (-);
same line, after "methyl" delete the semicolon (;);
line 58, change multiple space to a single space.
Col. 15, line 68, after "thiazole" insert a comma (,);
Col. 16, line 68, and Col. 18, line 4, "zine" should read --zinc--.

Signed and Sealed this

Twenty-eighth Day of June, 1988

Attest:

DONALD J. QUIGG

*Attesting Officer*      *Commissioner of Patents and Trademarks*